Aug. 4, 1953 W. J. COOK 2,647,743
SPRING DEVICE
Filed June 29, 1949 4 Sheets-Sheet 1

INVENTOR.
WILLIAM J. COOK
BY
ATTORNEYS.

Aug. 4, 1953 W. J. COOK 2,647,743
SPRING DEVICE
Filed June 29, 1949
4 Sheets-Sheet 2

INVENTOR.
WILLIAM J. COOK
BY
ATTORNEYS.

Aug. 4, 1953
W. J. COOK
2,647,743
SPRING DEVICE
Filed June 29, 1949
4 Sheets-Sheet 3
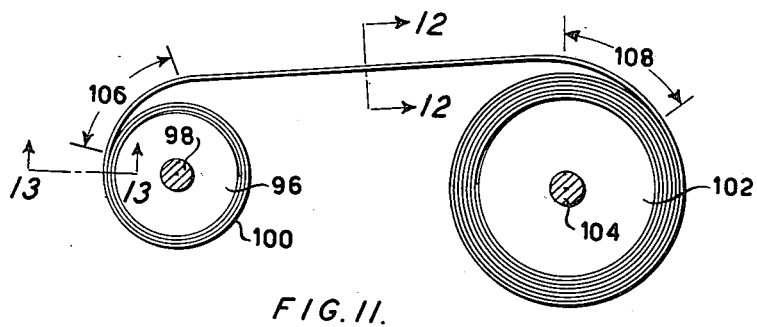
FIG. 11.
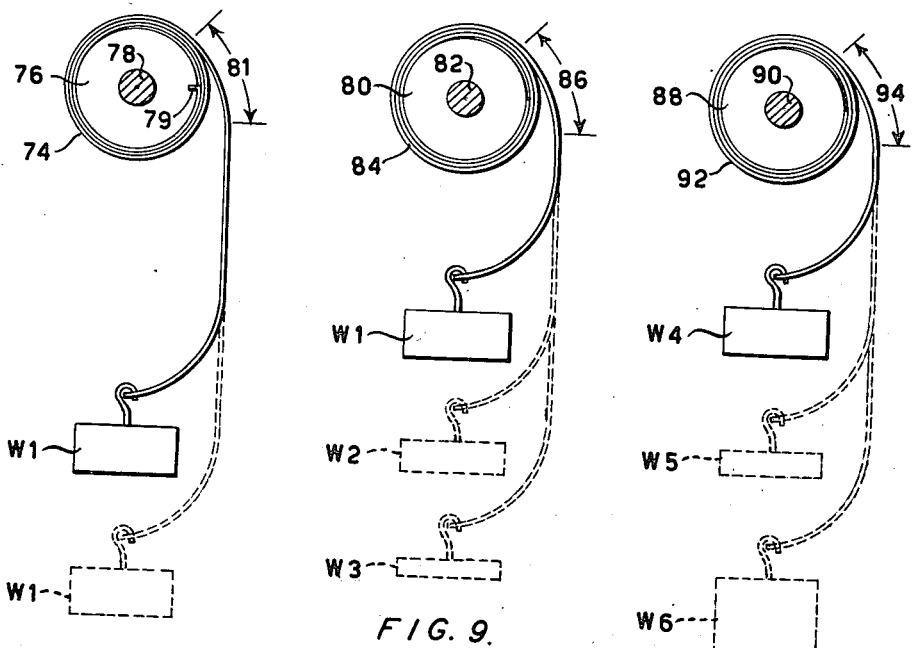
FIG. 8.
FIG. 9.
FIG. 10.
FIG. 12.
FIG. 13.
INVENTOR.
WILLIAM J. COOK
BY
ATTORNEYS.

Aug. 4, 1953 W. J. COOK 2,647,743
SPRING DEVICE
Filed June 29, 1949 4 Sheets-Sheet 4

INVENTOR.
WILLIAM J. COOK
BY
ATTORNEYS.

Patented Aug. 4, 1953

2,647,743

UNITED STATES PATENT OFFICE 2,647,743

SPRING DEVICE

William J. Cook, Lansdale, Pa., assignor, by mesne assignments, to Eastern Metals Research Co. Inc., New York, N. Y., a corporation of New York Application June 29, 1949, Serial No. 102,117

4 Claims. (Cl. 267—1)

This invention relates to a spring device.

The conventional spring devices heretofore used have a common characteristic, namely, a positive gradient, that is, the greater the deflection of the spring the greater is the total force exerted by the spring. It has long been sought to develop a spring device having a zero gradient or a negative gradient. Further, it has long been desired and never achieved to have a spring device which has a variable gradient, for example, including a plurality of positive, negative and zero gradients. Again the problem of making a spring having an initial force at initial deflection which is high compared to the maximum force which the spring can exert has not been overcome heretofore.

Previously known springs have been limited in usefulness due to their restricted range of action which, for example, is normally about two times its original length in the case of an extension spring. The working range of such a spring in many cases is desirably thirty to fifty times its original dimension.

Applicant has solved these and other problems by providing a coil spring device in which the force exerted by the spring is determined only by the force necessary to overcome the set of that portion of the spring which is being unwrapped.

It is, therefore, an object of this invention to provide a spring device which will exert a constant force at all times irrespective of the amount of deflection.

A further object of this invention is to provide a spring device which has a negative gradient, that is, which will, for each additional increment of deflection, exert a smaller total force.

A still further object of this invention is to provide a spring device which has a plurality of gradients varying from positive to negative.

An additional object of this invention is to provide a spring device which will exert an initial force at an initial deflection which may be as high as the maximum force which the spring device can exert.

An additional object of this invention is to provide a spring device which has a large range of action greatly exceeding its original dimensions.

An additional object of this invention is to provide a spring device which will act around corners without losses or inaccuracies with cable-like freedom.

An additional object of this invention is to provide a spring device which has a far greater capacity than a conventional coil spring made from the same amount of material to store energy.

These and other objects of this invention will become apparent from the following description, read in conjunction with the accompanying drawings, in which:

Figure 8 is a schematic showing of a spring device in accordance with this invention illustrating a spring designed to exert a constant force at all deflections;

Figure 9 is a schematic showing of a spring device in accordance with this invention illustrating a spring designed to exert a decreasing force as it is extended;

Figure 10 is a schematic showing of a spring device in accordance with this invention illustrating a spring designed to have a gradient varying from negative to positive;

Figure 11 is a schematic showing of a spring device in accordance with this invention utilized to exert a torque on a bushing freely mounted on a shaft;

Figure 12 is a section taken on the plane indicated by the line 12—12 of Figure 11;

Figure 13 is a section taken on the plane indicated by the line 13—13 of Figure 11;

Figure 1:
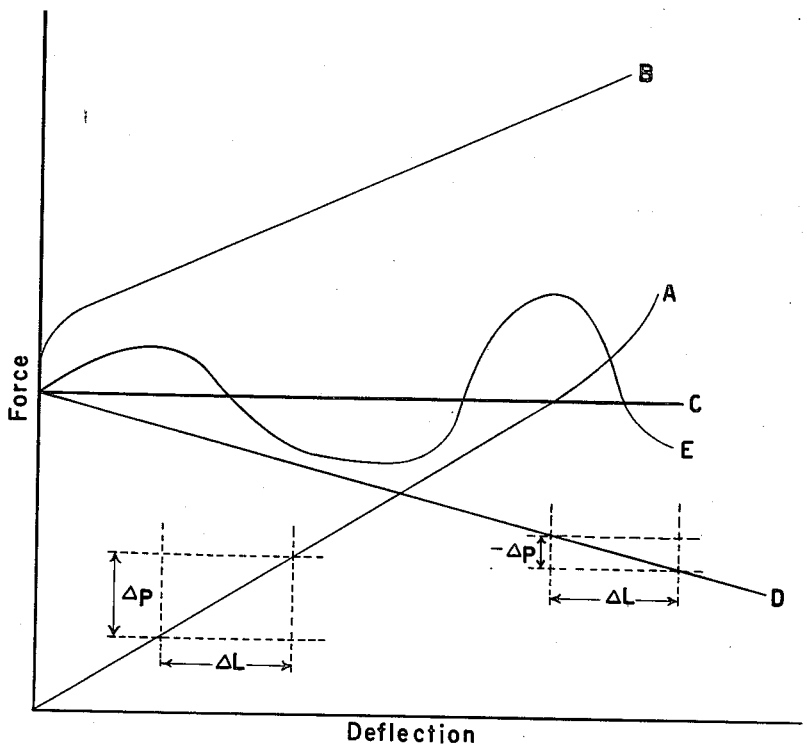
Figure 1 is a graph showing springs of various characteristics including springs in accordance with this invention.

A conventional compression spring has a substantially constant positive gradient K as shown by line A in Figure 1. As shown in Figure 1, for a positive increment of force ΔP, the spring will be deflected a positive increment of length ΔL. Since gradient $$K = \frac{\Delta P}{\Delta L}$$

it will be apparent that the gradient is substantially constant in the working range and always positive. The characteristics of a typical extension spring are shown by line B in Figure 1. It will be apparent from a comparison of line B with line A and a consideration of the above discussion that gradient K of the extension spring throughout its working range is substantially constant and always positive. The springs whose characteristics are shown by the lines A and B are typical of springs heretofore used.

The spring in accordance with this invention can be formed to exhibit characteristics very different from those of the above discussed conventional spring device. Thus, for example, a spring device in accordance with this invention may exhibit the characteristics indicated by line C in Figure 1, that is, such a device may have a zero gradient or, expressed another way, such a device exerts a constant force irrespective of the length of deflection. Such a spring, it will be apparent, has a multitude of applications.

Again a spring device in accordance with this invention may have a negative gradient K as illustrated by the line D in Figure 1. Here, for a positive increment of length ΔL, the force decreases by a negative increment of force in ΔP, since $$K = \frac{-\Delta P}{\Delta L}$$

it will be apparent that the gradient K is negative.

In all of the previous given examples as illustrated by lines A through D in Figure 1, it will be noted that the gradients K are substantially constant through the working ranges of the springs. Now, as illustrated by the line E in Figure 1, a spring in accordance with this invention may be formed with positive, negative and zero gradients. Thus, observing line E, it will be seen that it starts out with a decreasing positive gradient which goes to zero and then becomes negative, gradually becomes more positive, reaches zero, becomes increasingly positive and then substantially repeats this cycle. The manner in which these gradients are achieved will be made apparent in the following description.

Figures 2, 3:
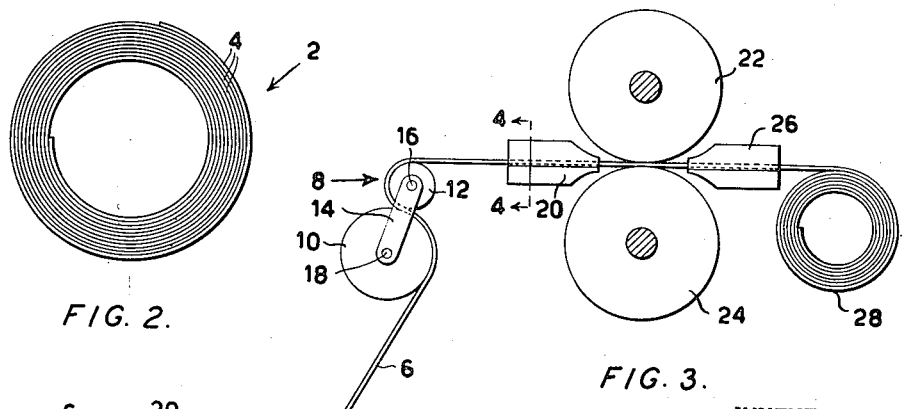
Figure 2 is a side elevation of a spring device in accordance with this invention.
Figure 3 is a schematic showing of mechanism adapted to produce a spring in accordance with this invention.

A spring 2 in accordance with this invention is shown in Figure 2. The spring 2 has a plurality of wraps 4. The spring 2 may be formed from strips of any resilient or springy metal commonly used in forming springs, thus, for example, stainless steel or a high carbon spring steel may be used. It is preferable to utilize flat strips of such material in forming the spring although various cross sectional shapes may be used.

It will be noted that each wrap 4 is in contact with its adjacent wrap 4. In the formation of the spring 2, it is necessary to put a set or stress in the strip 6 used to form the spring. As shown schematically in Figure 3 the set may be introduced by passing strip 6 through a setting device 8 which comprises rollers 10 and 12. A bracket 14 is secured to shaft 16 of roller 12 and shaft 18 of roller 10. Bracket 14 permits roller 10 to be moved in relation to roller 12 so as to vary the amount of set introduced into strip 6. It will be apparent, of course, that the set may be also varied by numerous other means such as, for example, by changing the size of roller 12.

As shown in Figure 3, after a set is introduced into strip 6, the strip passes through a guide 20, a pair of feed rollers 22 and 24, a guide 26, which is identical to guide 20 and is coiled as shown at 28.

The amount of set put into strip 6 is a very important factor in the formation of spring 2. It will be apparent that the set will vary depending upon the force or forces which it is desired that the spring exert as it is extended and also on the materials used.

It is essential that the inner radius of the spring remain substantially constant when the spring is in use. This requirement places certain limitations on the amount of set put into the strip forming the spring. Thus, where the spring is free to rotate on its natural axis, the set must be great enough so that the strip will naturally form a tight solid coil in order that an extension of the spring will not result in a change of the inner radius of the spring or of any of the coiled wraps. It will be apparent that this limitation will depend largely on the resiliency characteristic of the metal used and the friction between the wraps.

Where the spring is to be coiled onto a core such as, for example, a bushing mounted for rotation on a shaft, the limitations as to set are less restricted. In such a case, the spring need only be formed with such set so that each wrap or each increment of a wrap will naturally attempt to assume the shape of a portion of a circle which has a smaller radius than the surface on which it is to lie. Thus, each increment of the innermost wrap would, of necessity, have a natural radius equal to or smaller than the radius of the core on which it was coiled. Again, by way of example, each increment of the fourth wrap would have a radius equal to or smaller than the radius of the increment of the third wrap against which it was coiled.

The reasons for the above requirements are made obvious when the principle under which the invention operates is understood. The force of a spring device in accordance with this invention results when the spring is uncoiled. It is the section of the spring which is in the process of being straightened out by being drawn off the tight coil but which has not yet been fully straightened which exerts the force. The portion of the spring remaining in the solid coil and the portion which has been straightened out exert no force. Thus it will be apparent that as the spring is extended or contracted constantly changing sequential segments of the spring act to exert the spring force. By varying the preset in these segments, it will be noted that the force exerted will be varied or if the preset in the segments is constant then the force exerted will be substantially constant.

For satisfactory operation, it will be observed that there should be no slippage between the wraps and that the wraps should be tightly coiled otherwise forces other than that created incident to unwrapping will be introduced.

The force exerted by the segment of spring in accordance with this invention being unwrapped and therefore the total force being exerted by the spring is shown by the following formula where the spring is mounted, for example, on a spool:

$$F = \frac{EI}{2}\left[\frac{1}{R_n^2} - \left(\frac{1}{R_n} - \frac{1}{R_1}\right)^2\right]$$

where $F$ = the force exerted at the free end of the spring;
$E$ = modulus of elasticity;
$I$ = moment of inertia of segment uncoiling which is $$\frac{bT^3}{12}$$

where $b$ = width of stock and $T$ = thickness of stock;
$R_n$ = natural radius of curvature of the segment uncoiling;
$R_1$ = radius of the mounting and the depth of the coils not unwrapped.

Figure 4:
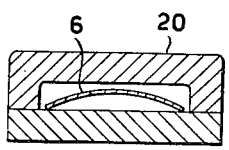
Figure 4 is a section taken on the plane indicated by the line 4—4 in Figure 3.

This formula is subject to a very slight inaccuracy due to the energy lost incident to the formation of a lateral camber in the uncoiling segment such as is shown in Figures 4 and 12.

Observing the above formula, it will be seen that if the spring is straightened out, $R_1$ will be infinite and the formula will read $$F = \frac{EI}{2}\left[\frac{1}{R_n^2} - \frac{1}{R_n^2}\right]$$

Since the expression within the bracket reduces to zero, F will be zero. This proves that when a segment of the spring has been straightened out it no longer exerts any force.

Figure 5:
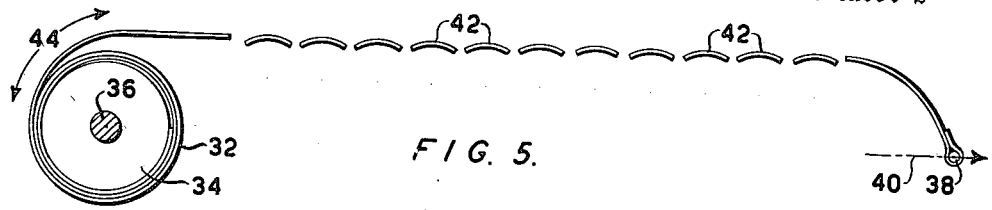
Figure 5 is a schematic view of a spring device in accordance with this invention showing segments of the extended portion of the spring severed from the spring and permitted to assume their natural shape.
Figure 6:
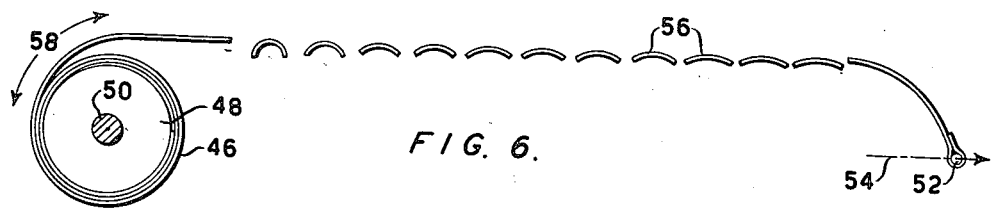
Figure 6 is a schematic view of a spring device in accordance with this invention showing segments of the extended portion of the spring severed from the spring and permitted to assume their natural shape.
Figure 7:
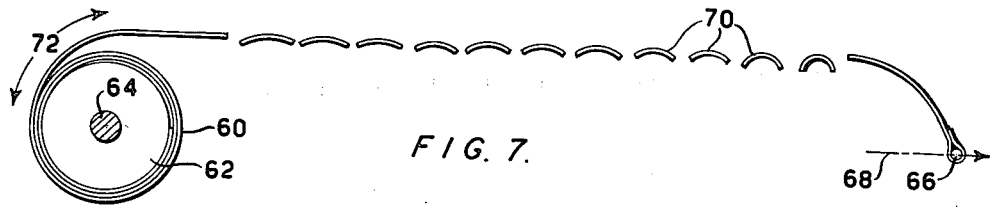
Figure 7 is a schematic view of a spring device in accordance with this invention showing segments of the extended portion of the spring severed from the spring and permitted to assume their natural shape.

It is believed that the underlying theory and the operation of this invention will be clarified by reference to Figures 5, 6 and 7. In Figure 5, a spring 32, which was made the same way that spring 2 was formed, is mounted on a bushing 34 which is adapted to rotate freely on shaft 36. End 38 of spring 34 has been extended by a force exerted in the direction indicated by arrow 40. Spring 32 was formed by setting or stressing a flat metal strip so that each increment 42 of the strip would tend to naturally assume a position on a circle of a radius smaller than the radius of bushing 34.

The increments 42 are shown schematically as severed from the extended portion of the spring. Each increment 42 has assumed its natural radius, the radii of the segments all being equal in this case. It will be clear that the force exerted by spring 32 as it is extended will be equal to the force being exerted to unwrap the increments 42 which lie between the last increment which is supported by the coiled wraps and the portion of the spring which is straightened out, this portion of the spring being indicated by arrows at 44. Since all of the increments 42 have been given the same set, it will be apparent that, irrespective of the amount which spring 32 is extended, it will exert the same force. Thus spring 32 exhibits the characteristics indicated by line C in Figure 1, that is, it has a zero gradient.

Referring now to Figure 6, a spring 46 which was made the same way spring 2 was formed is mounted on a bushing 48 which is adapted to rotate freely on shaft 50. End 52 of spring 46 has been extended by a force exerted in the direction indicated by arrow 54. Spring 46 was formed by setting or stressing a flat metal strip so that each increment 56 of the strip would tend to naturally assume a position on a circle. The set put in the flat metal strip was gradually decreased from the inner end of the spring to the outer end.

The increments 56 are shown schematically as severed from the extended portion of the spring, each increment having assumed its natural radius. It will be noted that the natural radii decrease as we progress from the coiled portion of the spring to the end 52. Here again, as in the case of spring 32, the force exerted by spring 46 results from the unwrapping of increments 56 in the area indicated by the arrows at 58, that is, in the area between the coil portion and the straightened out portion of the spring 46. As the spring is extended, the natural radii of the segments 56 in the unwrapping area gradually decreases. Thus the force necessary to unwrap the successive groups of increments lying in the unwrapping area gradually increases which, in turn, of course, means that the total force exerted by the spring gradually increases thus giving the spring a positive gradient. Depending upon the rate of change of the natural radii of the increments 56, the positive gradient of spring 46 may be constant or varying.

Referring now to Figure 7, a spring 60 formed as spring 2 was formed is mounted on a bushing 62 which is adapted to rotate freely on shaft 64. End 66 of spring 60 has been extended by force exerted in the direction indicated by arrow 68. Spring 60 was formed by setting a flat metal strip to provide increments 70 having gradually decreasing natural radii from the inner end of spring 60 to the end 66.

The increments 70 are shown schematically as severed from the extended portion of the spring, each increment 70 having assumed its natural radius. Here, again, the force exerted by the spring is the force being exerted to unwrap the segments 70 which lie in the unwrapping area (see arrows at 72) which is the area lying between the coil portion of the spring 60 and that portion which has been straightened out. As end 66 is extended, the natural radii of the segments 70 lying in the unwrapping area gradually increases and thus the total force exerted by the spring as it is extended decreases. Thus spring 60 has the characteristics indicated by line D in Figure 1, that is, it has a negative gradient.

Referring now to Figure 8, we have by way of further specific examples a spring 74 made like spring 2 and mounted on a bushing 76 which is adapted to rotate freely on shaft 78. The inner end 79 of the spring 74 is bent over to engage a slit in bushing 76. Spring 74 was formed by setting a flat metal strip of stainless steel so that each increment of the strip would tend to naturally assume a position on a circle of a radius equal to the radius of the bushing 76. For the purposes of illustrating the fact that such a spring has a substantially zero gradient, a weight W1 is schematically shown secured to the outer end of spring 74 in two different positions. This clearly illustrates that for any given point of extension of spring 74 the force exerted by the spring will be substantially constant and counteracted by a fixed weight W1, it being appreciated that the total force exerted by the spring is the force being exerted to unwrap the spring in the area indicated by the arrows at 81.

Where it is desired that spring 74 very accurately exert a constant force through its operating range, this may be accomplished by varying the set in the spring. It will be apparent that, since the outermost wraps are attempting to conform to surfaces having greater radii than the innermost wraps, the force exerted by the spring when the outermost wraps are being uncoiled will be slightly less than the forces successively exerted by uncoiling the innermost wraps. To overcome this variation in the exerted force, it is only necessary when forming the spring to gradually increase the set in the spring from the innermost wrap to the outermost wrap. Thus the increased set in the outermost wrap will compensate for the fact that this wrap is conforming to a greater radius than the innermost wrap and similarly all of the other wraps will be compensated for the varying radii on which they are coiled and thus the spring 74 can accurately exert a constant force irrespective of extension and has the characteristics shown by line C in Figure 1.

As shown in Figure 9, a bushing 80 is freely mounted for rotation on a shaft 82 and has coiled thereon a spring 84. Spring 84 was formed with a set which gradually increases from the inner wrap to the outermost wrap, the set of the innermost increment being such that the increment would naturally assume a radius smaller than the radius of the bushing and every segment has a natural radius which will cause it to lie tightly on the surface beneath it. The force exerted by the spring is that being exerted to unwrap the increments in the unwrapping area indicated by the arrows at 86. Thus, as shown in Figure 9, when the spring 84 is extended to a position where weight W1 is secured to it, it will exert a fairly considerable force. Again, as shown, if weight W1 is removed and the spring extended to the position shown in support of weight W2, it will exert a smaller total force as indicated by the fact that weight W2 is smaller than weight W1. Again if we discard weight W2 and extend the spring to the position shown in support of weight W3, it will be apparent that spring 84 will exert a force smaller than that represented by weights W1 or W2. Such a spring has the characteristics shown by line D in Figure 1.

In Figure 10 is shown a bushing 88 freely mounted for rotation on a shaft 90 and carrying a spring 92 in accordance with this invention. Spring 92 is set so as to have various gradients both positive and negative. The portion of the spring which is first uncoiled has a negative gradient, subsequent portions uncoiled having a positive gradient. This, of course, is achieved by having in the portion first uncoiled a progressively decreasing amount of set while the positive gradient in succeeding coils of the spring is achieved by progressively increasing the set. The set of each increment must, of course, insure that the increment has a natural radius which causes it to hug the surface below it. These characteristics of spring 92 are illustrated by the schematic showing of weights W4, W5 and W6 which, as indicated, will balance the force exerted by spring 92 at various points of extension of the spring, it being understood that the total force exerted by the spring is that force being exerted to unwrap the increments lying in the upwrapping area indicated by the arrows at 94. Thus as the spring is extended from the point where it will balance weight W4 to the point where it will balance weight W5 the gradient is decreasing as evidenced by the fact that weight W5 is smaller than weight W4. As the spring is extended from the point where it will support weight W5 to the point where it will support weight W6, the gradient of the spring is increasing rapidly as evidenced by the fact that weight W6 is markedly greater than the weight W5 or even weight W4. Such a spring has the characteristics represented by the center part of curve E in Figure 1.

Figure 11 shows a spring in accordance with this invention utilized to introduce a fixed resistance to the motion of a shaft. Here a bushing 96 is freely mounted for rotation on a shaft 98 and carries a spring 100. Spring 100 is formed with a slightly and progressively increasing set from the interior wrap on bushing 96 to the exterior wrap so, as in the case of the example of Figure 8, it will exert a constant force irrespective of the amount of extension. The set of the interior wrap is such that it will have a natural radius of curvature equal to the radius of the bushing 96. A portion of spring 100 is extended to a bushing 102 and coiled thereon. Bushing 102 is keyed to shaft 104. It will be apparent that the uncoiled and unstraightened portions of spring 100 adjacent bushings 96 and 102 in the upwrapping areas indicated by arrows at 106 and 108, respectively, will result in a net force tending to rotate bushing 102 counterclockwise since the portion of the spring adjacent bushing 102 is more opened out against the set than is the portion adjacent bushing 96 due to the fact that it is coiled on a greater radius. It will further be apparent that this net force will remain substantially constant irrespective of the number of turns clockwise or counterclockwise of shaft 104.

Figure 14:
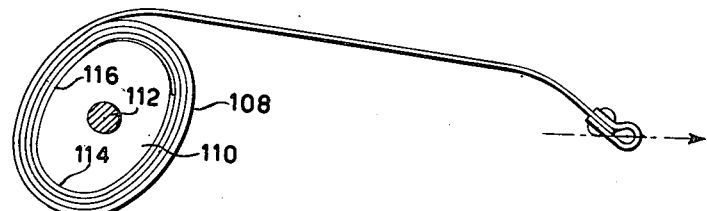
Figure 14 is a schematic showing of a spring in accordance with this invention utilized in conjunction with an elliptical spool mounted for rotation.

As shown in Figure 14, the force characteristics of a spring in accordance with this invention may be varied by the shape of the core on which the spring is mounted. Here a spring 108 in accordance with this invention is mounted on an elliptically shaped mandrel 110 which has its center mounted for rotation on a shaft 112. A constant set has been placed in the spring 108 such that the natural radius of each increment of the spring is smaller than the minimum radius of the surface of the core.

As we have seen before, if such a spring were mounted on a round mandrel or bushing, the force exerted by the spring would be constant irrespective of the amount of extension of the spring. Here, however, the elliptical shape of the core 110 modifies the force characteristics of spring 108 in such a manner that the force characteristic curve of the spring becomes sinusoidal, that is, the gradient of the spring will vary from positive to negative cyclically. The reason for the variation results from the fact that the elliptical shape causes some portions of the coiled spring to be carried in a more unwrapped state than other portions of the spring. Thus, for example, the increments of the spring which are coiled in the vicinity of the point indicated at 114 can more nearly assume their natural radii than can increments which are coiled in the vicinity of the point indicated at 116. It will be apparent that the more the mounting surface prevents the spring increments from assuming their natural radii, the less will be the force necessary to straighten out these increments. Thus, as here, by varying the shape of the mounting surface the force which a given increment of a spring in accordance with this invention can exert can be varied.

Figure 15:
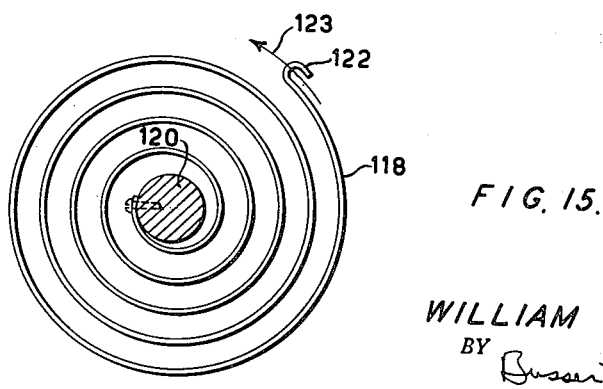
Figure 15 is a schematic showing of a conventional loose coil spring showing one end secured to a shaft.

Referring now to Figure 15, a strong contrast with the springs in accordance with this invention is provided by a conventional spiral spring 118. Spring 118 has its inner end fixedly secured to a shaft 120 and a free outer end 122. By way of contrast with the spring in accordance with this invention, it will be noted that the coils of spring 118 are not in contact with each other. If a force is exerted in the direction indicated by arrow 123, the entire length of spring 118 acts like a long bent beam to exert a torque on shaft 120. This is in strong contrast with the above discussed springs made in accordance with this invention and which are adapted to exert their total force through the medium of that portion of the spring which is being straightened out, that is, the portion of the spring lying in the unwrapping zone between the coil and the straightened out portion of the spring. It will be apparent that no constant or negative gradient could be achieved with spring 118 as is demonstrably achievable with springs in accordance with this invention.

Figure 16:
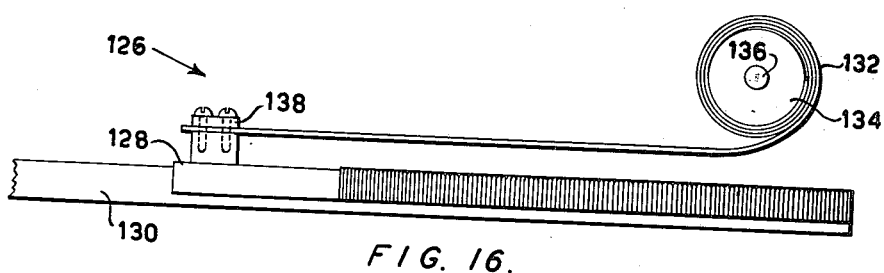
Figure 16 is a showing of a portion of a stapler as illustrative of the utility of a spring device made in accordance with this invention and capable of exerting a constant force at all deflections.

The schematically shown staple feeder 126 (see Fig. 16) is further exemplary of the use of a spring in accordance with this invention. Here the staple feed slide 128 travels on rail 130. A constant force spring 132 having a fixed set resulting in a natural radius of curvature equal to the radius of bushing 134 is coiled on bushing 134 which is freely mounted for rotation on a shaft 136 and the free end of the spring extends to slide 128 and is secured thereto by a shoe 138. It will be quite evident that the constant force spring 132 will be highly advantageous in that it will result in a uniform feed by the staple feeder 126 in contrast to the commonly used coil spring which exerts a decreasing feeding force as the staples are used.

Figure 17:
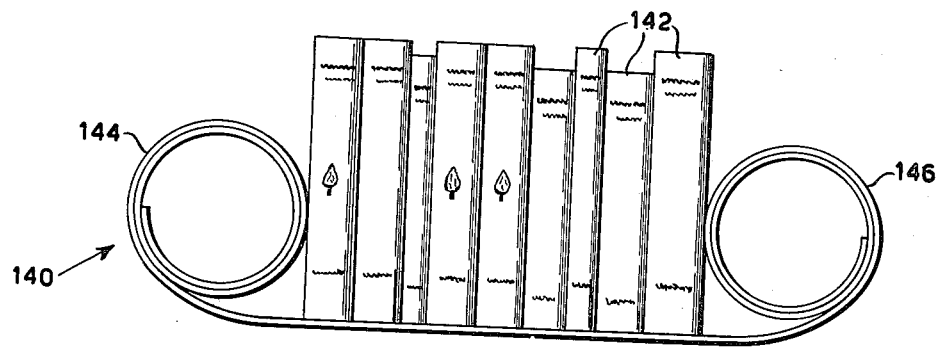
Figure 17 is a front elevation view of a spring device in accordance with this invention adapted for use as a clamp.

As shown in Figure 17, a spring device 140 in accordance with this invention may be used to effect a clamping action such as, for example, as a substitute for conventional book ends in clamping together a plurality of books 142. The spring device 140 is formed with a constant set and is coiled at opposite ends to form coils 144 and 146. It will be apparent that, irrespective of the thickness of the books being held and correspondingly irrespective of the distance between coils 144 and 146, the spring device 140 will exert a substantially fixed force against the books.

Figure 18:
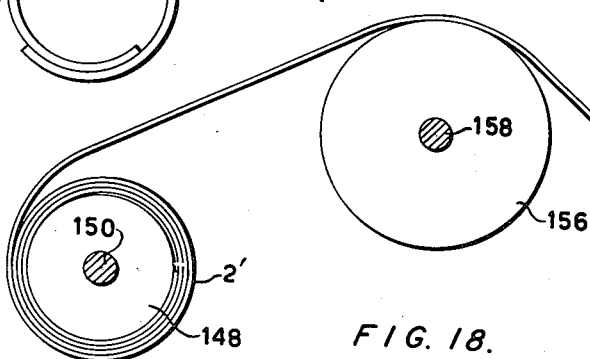
Figure 18 is a schematic representation of the manner in which a spring in accordance with this invention is adapted to, in effect, go around corners.

As shown in Figure 18, a spring device in accordance with this invention is of great utility where it is desired, for example, to, in effect, go around a corner. Here a spring 2' in accordance with this invention has one end coiled about a bushing 148 which is mounted for rotation on shaft 150 and its other end coiled about a bushing 152 which is freely mounted for rotation on shaft 154. Spring 2' has a constant set which places a natural radius in the spring 2' which is equal to the equal radii of bushings 148 and 152. It will be noted that in passing from bushing 148 to bushing 152, spring 2' passes around a spool 156 which is freely mounted for rotation on a shaft 158.

Since spring 2' has a constant set and bushings 148 and 152 have the same radius, it will be apparent that the force developed by the unwrapping of the spring 2' from bushing 148 will equal the force developed by unwrapping the spring from bushing 152. The passage of spring 2' around the corner formed by spool 156 will not disturb this equilibrium since, in passing about spool 156, spring 2' is being unwrapped on the side of the spool facing bushing 148 an amount exactly equivalent to the amount it is being unwrapped on the side of the spool 156 facing bushing 152. Thus the forces created by the unwrapping incident to passing around spool 156 will exactly balance each other. It will be apparent that this ability to change the direction of the operation of spring 2' without disturbing in any way its force characteristics is an extremely useful one.

Figure 19:
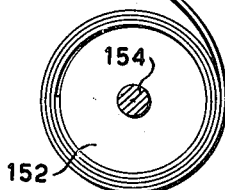
Figure 19 is a schematic showing of a helical spring in accordance with this invention.
Figure 19:
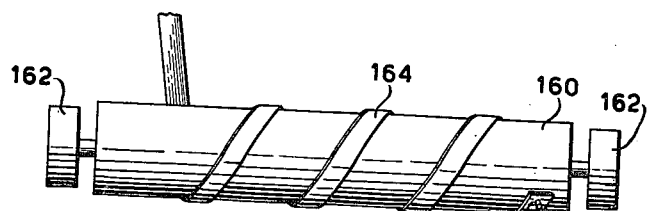

As shown in Figure 19, where a core is to be utilized, the spring in accordance with this invention may take the form of a helix. Here we have a core 160 mounted for rotation in bearings 162. A spring 164 is secured to the one end of the core 160 at 166.

Spring 164 is helical in form and is set so that the natural radius of each segment of the spring is smaller than the radius of the core so that the spring lies flat against the core. Here again it will be apparent that the force exerted by the spring 164 will result from that increment of the spring which is being unwrapped from the core and which has not yet been straightened. The set placed in a helical spring device such as described may be varied in accordance with the principles set forth and illustrated above.

Figure 21:
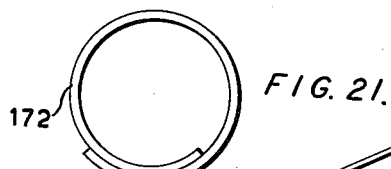
Figure 21 is a plan view of a clip having overlapping ends in accordance with this invention.
Figure 20:
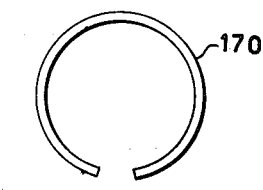
Figure 20 is a plan view of a clip in accordance with this invention.

As shown in Figures 20 and 21, the springs in accordance with this invention may be utilized to produce clips. A circular clip 170 which is less than 360° (see Fig. 20) or a similar clip 172 which has overlapping ends can readily be fashioned by taking a preset spring such as the spring 2 and cutting off increments of the desired length which will tend to assume the natural radius set in the spring. Formation of clips in this manner is very advantageous since it eliminates the heretofore used heat treating processes utilized to make clips as clip 170. The formation of clips having overlapping ends such as the clip 172 has not heretofore been possible by a practicable process.

It will be apparent that the basic uses for spring devices in accordance with this invention are numerous and varied. Exemplary are: (1) as a spring (extension or compression); (2) as a self-adjusting clamp, clip, or wrapping; (3) as a vernier force compensator; (4) as a transducer for converting energy from one system to another; (5) as an automatic coiling device; (6) as a friction band; (7) as a telescopic tube form; and (8) as a means of power or motion transmission.

The flat or receding force characteristic and the great extendability are useful as a spring where constant loads are required. This is wherever levers, pulleys and dead weights are currently used for replacement of, or in conjunction with, torsion, spiral, normal extension, compression, or power springs.

An example of a desirable application for a truly negative gradient is in opening and closing devices. Here it is desirable to start the opening with minimum force but to assure greater restraint in the open position. A spring having a flat force-deflection characteristic makes a highly desirable means of replacing counter weights and sash weights. Many applications result from the small cubical space required by a negative spring in its coiled state, and its ability to act around pulleys.

As a transducer for converting mechanical energy to electric modulation or to magnetic modulation, the negative spring is useful because of the "solid" nature of the free coil. The device is useful as a variable resistor, the modulation of which is evenly continuous, and not by incremental steps. The coil form also makes it useful for changing the amount of laminated core iron in a magnetic field. It can be utilized as a potentiometer slide-wire and for vernier adjustment of a force member.

Simplifications of mechanisms for the reeling of cables and bands are posssible by using the spring as a self-winding tape, which automatically coils itself tightly.

As a friction element, the negative spring simplifies braking arrangements. A simple clip in accordance with this invention acts as an automatic friction band that exerts uniform pressure around circular drums. It is no longer necessary in designing braking devices to think only of rigid shoes or flexible bands which are externally pressed on drums or shafts by springs-and-lever system. The braking pressure can now be inherent in the brake band member.

Because the negative spring offers active pressure of coil on coil, telescopic tube forms may be developed for new functions. It is practical to control such attributes as light-tightness, leak-proofness and lateral rigidity in this device.

Finally, to transmit power or motion, designers can consider the spring as: (1) a means of translating linear into circular motion or vice versa, and (2) as a pulley-belt with a single leg and automatic take-up features. Applications to circuit tuning augur the elimination of take-up springs and flexible bands with their replacement problems.

It will be apparent that the above description and examples are for purposes of illustration only and that it is desired to be limited only as set forth in the claims.

What is claimed is:

1. A spring device comprising a pair of mandrels, means supporting said mandrels for rotation, a resilient metal strip, the opposite ends of said strip being coiled on said mandrels, each increment of said strip being set to naturally assume the shape of a portion of a circle, the radii of said circles being sufficiently small so that the coiled increments will fit tightly against the surfaces of said mandrels.

2. A spring device comprising a pair of mandrels having different diameters, a resilient metal strip, the opposite ends of said strip being coiled around said mandrels, the increments of said strip being set on radii sufficiently small to cause the increments to fit tightly against said mandrels, and the radii of said increments varying progressively from one end of said strip to the other.

3. A spring device comprising a pair of mandrels, a resilient metal strip, the opposite ends of said strip being coiled around said mandrels, each increment of said strip being set to normally assume the shape of a portion of a circle and being set to fit tightly against the surface on which they rest, and means between said mandrels to deflect the portion of the strip between the mandrels to dispose the portions of the strip on opposite sides of said means in angular relation.

4. The spring device set forth in claim 3 in which said mandrels have the same diameter and the normal set of the spring, when unstressed, is uniform throughout its length.

WILLIAM J. COOK.

References Cited in the file of this patent

UNITED STATES PATENTS

| Number | Name | Date |
|---|---|---|
| 122,288 | Smith | Dec. 26, 1871 |
| 377,489 | Logan | Feb. 7, 1888 |
| 1,010,130 | Duffy | Nov. 28, 1911 |
| 1,331,677 | Schachter | Feb. 24, 1920 |
| 1,860,878 | Webb et al. | May 31, 1932 |
| 1,977,546 | Fornelius | Oct. 16, 1934 |
| 2,175,516 | Bugatti | Oct. 10, 1939 |
| 2,192,101 | Peskin | Feb. 27, 1940 |
| 2,363,113 | Bennet | Nov. 21, 1944 |
| 2,457,705 | Moran | Dec. 28, 1948 |

FOREIGN PATENTS

| Number | Country | Date |
|---|---|---|
| 94,867 | Switzerland | May 16, 1922 |
| 442,681 | Great Britain | Feb. 13, 1936 |
| 609,673 | Great Britain | Oct. 5, 1948 |